(12) United States Patent  
Mishkin et al.

(10) Patent No.: US 8,792,356 B2  
(45) Date of Patent: Jul. 29, 2014

(54) DETERMINING TELECOMMUNICATION SUBSCRIBER METRICS

(75) Inventors: Gregory Evan Mishkin, Cumming, GA (US); Francis B. Linnane, Alpharetta, GA (US); Jeffrey T. Johnson, Edmond, OK (US); Nancy Florence Burton, San Antonio, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 329 days.

(21) Appl. No.: 13/409,402

(22) Filed: Mar. 1, 2012

(65) Prior Publication Data

US 2012/0163225 A1   Jun. 28, 2012

Related U.S. Application Data

(63) Continuation-in-part of application No. 12/423,371, filed on Apr. 14, 2009.

(51) Int. Cl.
*H04L 1/00* (2006.01)
*H04W 72/00* (2009.01)

(52) U.S. Cl.
USPC ............... 370/236.1; 370/236.2; 455/450

(58) Field of Classification Search
CPC .............................. H04L 2012/5625
USPC ............................................ 370/236.1
See application file for complete search history.

(56) References Cited

U.S. PATENT DOCUMENTS

| | | | |
|---|---|---|---|
| 6,196,129 B1 | 3/2001 | Kellett | |
| 6,516,189 B1 | 2/2003 | Frangione et al. | |
| 6,745,001 B2 | 6/2004 | Wright et al. | |
| 6,751,295 B2 | 6/2004 | McCulley et al. | |
| 6,754,470 B2 | 6/2004 | Hendrickson et al. | |
| 6,788,926 B1 | 9/2004 | Frangione et al. | |
| 6,807,515 B2 | 10/2004 | Vogel et al. | |
| 6,928,280 B1 | 8/2005 | Xanthos et al. | |
| 7,013,136 B2 | 3/2006 | Frangione et al. | |
| 7,319,847 B2 | 1/2008 | Xanthos et al. | |
| 7,505,765 B2 | 3/2009 | Frangione et al. | |
| 2003/0229534 A1 | 12/2003 | Frangione et al. | |
| 2005/0197105 A1 | 9/2005 | McCann | |

(Continued)

FOREIGN PATENT DOCUMENTS

WO   WO 2010/120602    10/2010

OTHER PUBLICATIONS

International Patent Application No. PCT/US2010/030162: International Search Report dated Apr. 8, 2011, 2 pages.

(Continued)

*Primary Examiner* — Huy C Ho

(74) *Attorney, Agent, or Firm* — Baker & Hostetler LLP

(57) ABSTRACT

Information associated with a communication is gathered at a switching point during the routing process to determine subscriber metric information associated with an active service identifier. The information relates to the originator of the communication and the target. The information is compared to a provider database to determine a carrier originally associated with the active service identifier. The information is then compared to a porting database to determine if the active service identifier was ported, and if so, to which carrier the active service identifier was ported. A determination can then be made regarding which carrier is associated with the active service identifier. Various systems and methods may be used to determine a number of subscribers, a number of new subscribers, and a number of disconnected subscribers for a given carrier in a given market.

20 Claims, 12 Drawing Sheets

(56) References Cited

U.S. PATENT DOCUMENTS

| | | |
|---|---|---|
| 2007/0099609 A1 | 5/2007 | Cai |
| 2008/0221968 A1 | 9/2008 | Gaffney et al. |
| 2008/0248795 A1 | 10/2008 | Peterson et al. |
| 2008/0299910 A1 | 12/2008 | Peterson et al. |
| 2009/0005002 A1 | 1/2009 | Agarwal et al. |
| 2010/0261449 A1 | 10/2010 | Mishkin |

OTHER PUBLICATIONS

Poole, "Estimating the Size of the Telephone Universe: A Bayesian Mark-Recapture Approach," KDD'04, Aug. 22-25, 2004, Seattle, Washington, USA, 659-664.

DETERMINING TELECOMMUNICATION SUBSCRIBER METRICS

CROSS-REFERENCE TO RELATED APPLICATIONS

This application is a continuation-in-part of U.S. application Ser. No. 12/423,371, filed on Apr. 14, 2009, which is herein incorporated by reference in its entirety.

BACKGROUND

Communications services have become an important part of modern life (e.g., phone service, internet service, text messaging service, paging service, GPS service, music service, gaming service, and the like), as have the devices associated with the communications (e.g., telephones, including cellular telephones, computers, notebook computers, personal digital assistants, music players, gaming systems and the like). As one example, cellular telephone usage has proliferated rapidly over the past decade. By some estimates, cellular telephone usage in the United States alone has grown from 34 million users in 1995 to over 200 million in 2005.

Subscriber metrics describe characteristics of subscribers, especially as they relate to carriers. For example, subscriber metrics may estimate carrier market share (e.g., the number of subscribers associated with a given carrier in a market as a percentage of the total number of subscribers in the market), the number of subscribers associated with a carrier in a market, carrier churn rate, carrier activation rate (or number of activations for a carrier in a given period), carrier deactivation rate (or number of deactivations for a carrier in a given period), and the like.

By analyzing subscriber metrics, carriers may be better able to utilize marketing resources. This may include being able to determine needs or preferences of subscribers and offering products or services that appeal to those needs or preferences.

Changes in subscriber metrics may happen over short periods of time. Carriers may find it beneficial to be apprised of subscriber metrics often and with little lag time. For example, if carriers are timely informed of changes in the needs or preferences of subscribers, carriers may be able to reallocate resources in response to changing subscriber needs or preferences.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

The disclosed embodiments provide systems, methods, and computer-media comprising instructions for determining subscriber metrics based on information gathered in a communications network.

A communication, such as a phone call for example, may be routed through a network. As part of the routing, the communication may be switched at a switching point. A record of the communication, such as a call detail record associated with a phone call, may be created at the switching point in the network. The record may comprise information fields relating to the communication, including information fields that identify an active service identifier(s) associated with the communication. For example, for a phone call, a call detail record may comprise active service identifiers, such as an originating phone number and/or a target phone number.

Information in the record may be compared to information in one or more databases to determine which carrier is associated with an identified active service identifier. For example, still using a phone call example, a phone number (e.g., the originating phone number and/or target phone number) may be compared to a service provider number database (e.g., a database that identifies the carrier that was originally assigned to the number). An example of such a database is the Local Exchange Routing Guide (LERG). Thus, the carrier originally assigned to the phone number is determined.

The phone number may also be compared to a porting database (e.g., a database that identifies numbers that have been ported and the carrier information relating to the porting). An example of a porting database is the Local Number Portability (LNP) database. By comparing the phone number to the LNP, a determination of the carrier associated with the number may be performed. That is, the phone number may be associated with the carrier originally assigned to the phone number, unless the porting database indicates another carrier.

The carrier data may be aggregated to provide subscriber metrics. For example, as described above, a carrier may be associated with an active service identifier by using information from a communication of any type, including a switched communication. When switching a large number of communications, a large number of active service identifiers may be identified (e.g., a carrier may switch a large amount of communications in a particular market). Further, each of the identified active service identifiers may have an associated carrier. By aggregating the active service identifiers associated with a given carrier in a market, the number of subscribers for that carrier may be calculated (i.e., a number of subscribers for the given carrier in a particular market may be determined). In addition, by comparing the amount of subscribers associated with the given carrier in a market with an estimated or determined total number of subscribers in the market, a market share for the given carrier may be determined.

In an embodiment, a subscriber count for a particular carrier in particular area determined using any methods and systems disclosed herein may be adjusted based on publicly reported numbers for that carrier for a larger or different area. The difference (e.g., percentage difference) between the count/market share determined for the larger area using alternate means, such as those disclosed herein, and the count/market share as publicly disclosed by the particular carrier may be used to adjust the count/market share for smaller or other areas determined using means such as those disclosed herein.

Disclosed systems, methods, and computer-executable instructions may be used to determine or estimate a number of subscribers for a particular carrier. In an embodiment, a first count of subscribers associated with a first carrier in a first area may be determined for a first time period, and a second count of subscribers associated with the first carrier in the first area may be determined for a second time period. An overlap number of subscribers that appeared in both the first count and the second count may be determined. A final estimate of the number of subscribers may be determined by dividing the product of the first count and the second count by the overlap count.

Disclosed systems, methods, and computer-executable instructions may be used to determine or estimate a number of subscribers that are newly added for a particular carrier. In an embodiment, a service identifier identified in a second time period may be determined to have not been present in data (e.g., call detail records) for a previous time period. If the service identifier has had a number of contacts (e.g., service requests) with the network that is at or above a threshold value, the service identifier may be determined to be a new subscriber.

Disclosed systems, methods, and computer-executable instructions may be used to determine or estimate a number of subscribers that have disconnected from a particular carrier or become deactivated. In an embodiment, a service identifier that has been detected in one or more previous time periods may be determined to have not been present in data (e.g., call detail records) for a current or more recent time period. If the service identifier has previously had a number of contacts (e.g., service requests) with the network that is at or above a threshold value, the service identifier may be determined to be a disconnected or deactivated subscriber.

Disclosed systems, methods, and computer-executable instructions may be used to detect a "text blast." An example of a text blast may include sending messages to a large number of recipients. Although referred to as a text blast, such messages may contain text, graphics, images, video, multimedia, audio, or any combination thereof to multiple recipients. Many of these recipients may be inactive subscribers. Upon detection of a text blast, analysis may be performed to confirm that the text blast occurred and to determine which recipients of the text blast are inactive subscribers. The inactive subscribers may be removed from a count of total subscribers for the associated carrier.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

DETAILED DESCRIPTION

The detailed description that follows may refer to steps (i.e., portions of a method). However, the disclosed steps and associated methods are illustrative. The order of the steps may be varied where appropriate. In addition, steps may be omitted if not needed and additional steps may be added where appropriate.

The term "subscriber" may refer to an end user of a communication service, e.g., an end-user of phone service, internet service, text messaging service, paging service, GPS service, music service, gaming service, or the like. A subscriber of mobile telephone communication service may be referred to as a mobile subscriber. For example, a mobile subscriber may be associated with a phone number that the mobile subscriber uses with a mobile communications device, such as a cellular telephone.

The terms "cellular telephone" and "mobile telephone" may be used interchangeably herein. Further, the term phone call may refer to any type of phone call (e.g. a call from/to a cellular telephone, a call from/to a land line telephone, etc.).

The term "carrier" may refer to an entity that provides communication services to subscribers. For example, a carrier may route calls to or from a subscriber using networks owned or operated by the carrier and/or other networks.

Mobile subscribers may enter into an agreement for services with a carrier in order to be able to use associated cellular telephones. Further, carriers may compete to attract mobile subscribers.

The present disclosure describes with particular reference and application to mobile communications services, and in particular to mobile subscribers; however, the claimed embodiments are not intended to be limited to mobile communications services or mobile subscribers. The claimed embodiments are equally applicable to any service capable of performing as herein described. For example, subscriber metrics may be determined as herein described for other services routed through a network (e.g., internet service, text messaging service, paging service, GPS service, music service, gaming service, and the like).

Figure 1A:
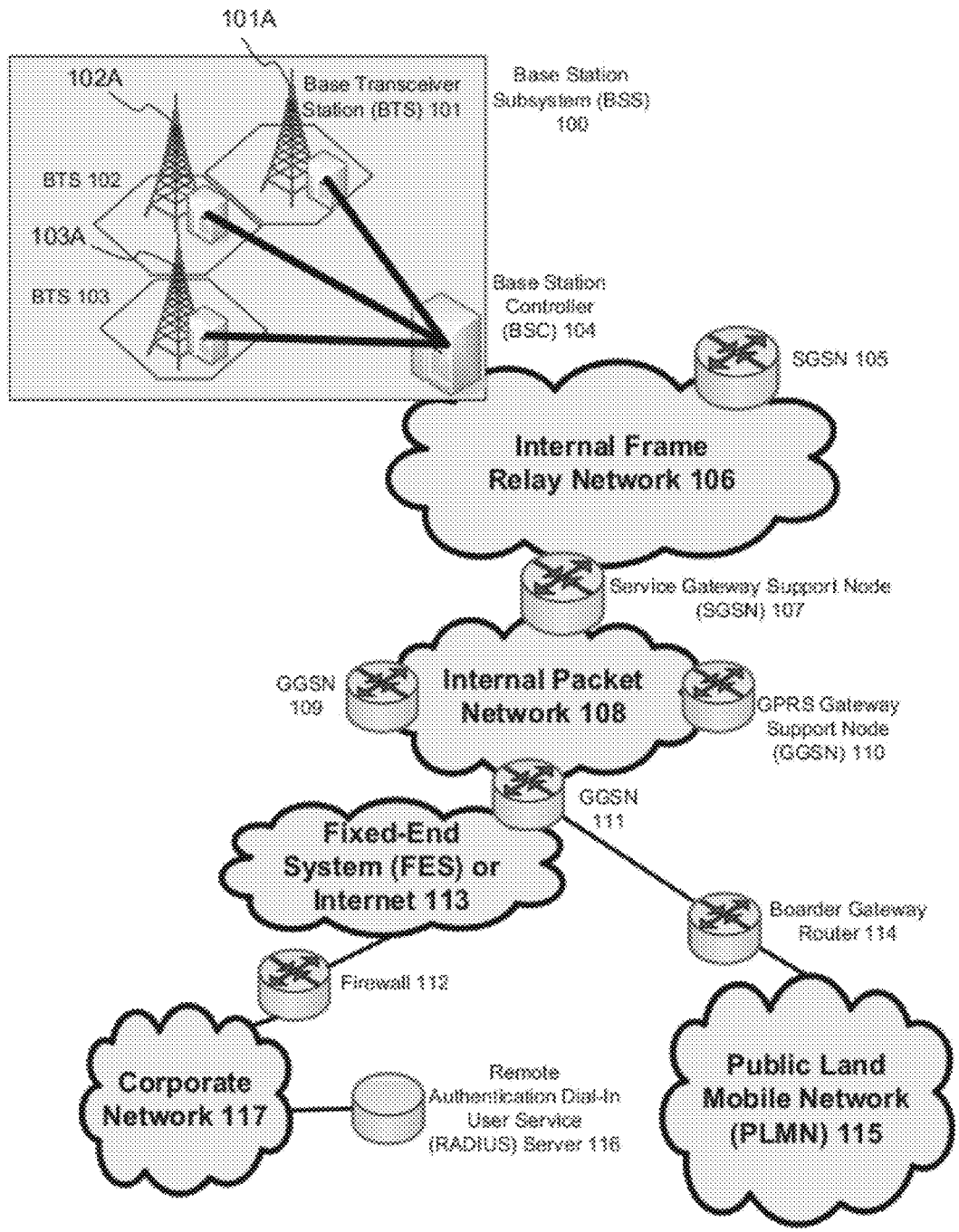
FIG. 1A illustrates an overview of an illustrative network environment in which aspects of one or more embodiments may be implemented.
Figure 1B:
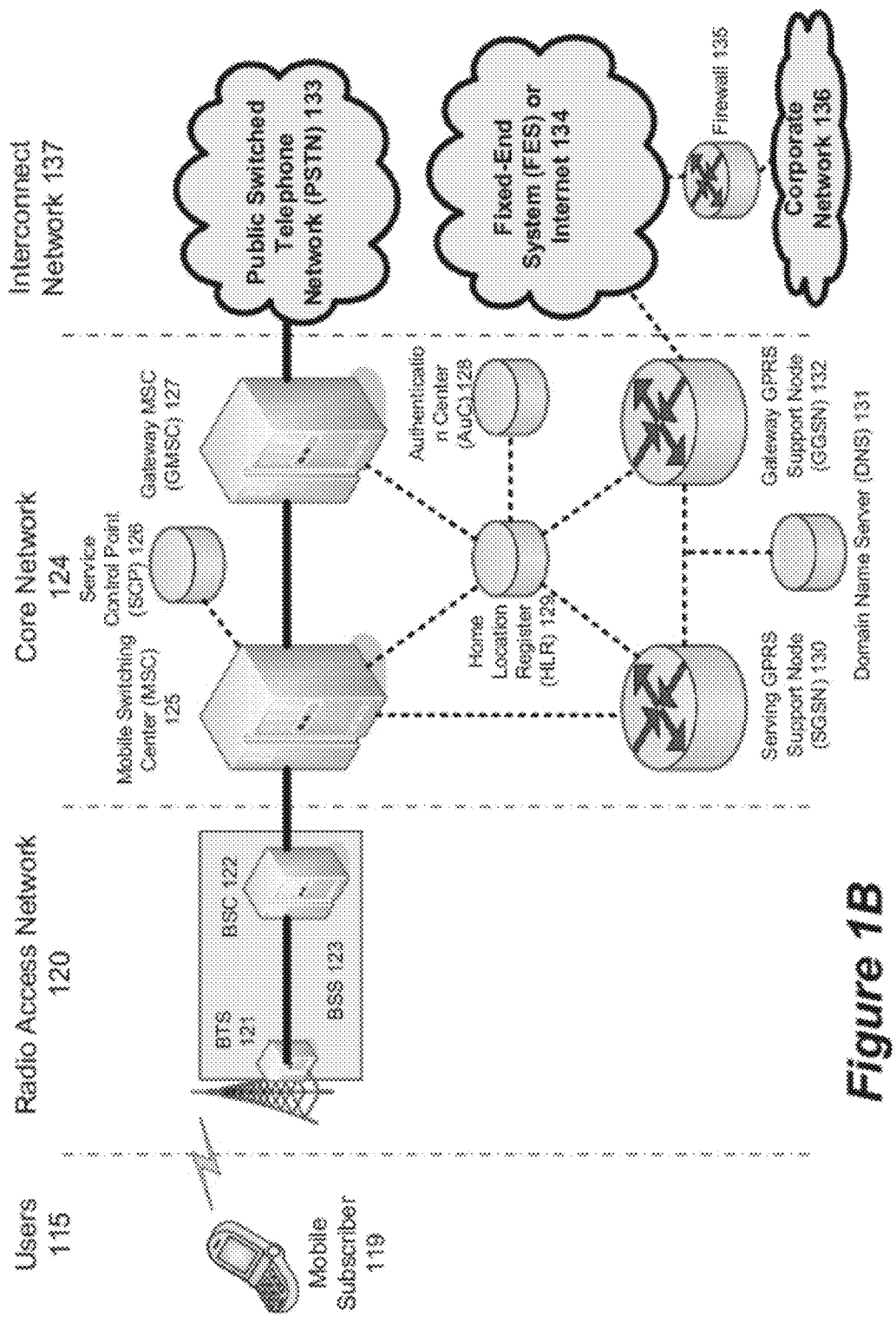
FIG. 1B illustrates an illustrative GPRS network architecture in which aspects of one or more embodiments may be implemented.
Figure 2:
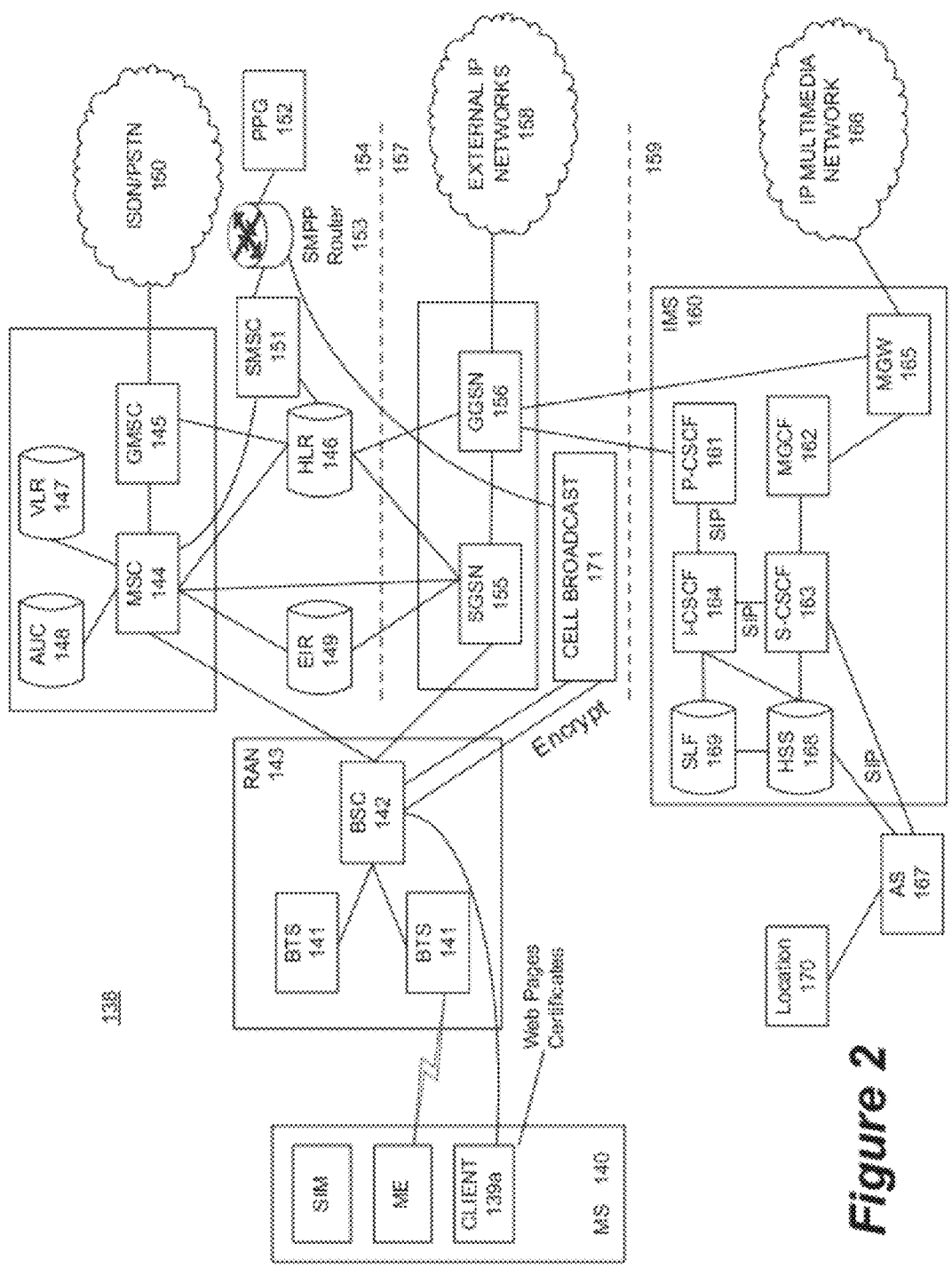
FIG. 2 illustrates an alternate block diagram of an illustrative GSM/GPRS/IP multimedia network architecture in which aspects of one or more embodiments may be implemented.

FIGS. 1A, 1B and 2 depict some example telephony radio networks and non-limiting operating environments in which a call enhancement with localized information system may be implemented. The operating environments described herein should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G, 4G, Long Term Evolution (LTE), and LTE-Advanced services, including Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. Those skilled in the art will recognize that the example packet-based mobile cellular network environment illustrated in FIG. 1A may also represent an LTE or LTE-Advanced network, and that the devices and components illustrated in FIG. 1A may have counterparts performing similar functions in LTE and LTE-Advanced networks. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103. BTSs 101, 102 and 103 may include antennas 101A, 102A and 103A respectively. BTS's may be the access points where users of packet-based mobile devices become connected to the wireless network. In an embodiment, the packet traffic originating from user devices (e.g., cellular phones) is transported via an over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 111, 110, etc.

As illustrated, the SGSN 107 and the GGSNs 111 and 110 may be part of the internal packet network 108. Gateway GPRS serving nodes 111 and 110 may provide an interface to external Internet Protocol ("IP") networks such as Public Land Mobile Network ("PLMN") 115, corporate intranets 117, a Fixed-End System ("FES") and/or the public Internet 113 and/or the like. As illustrated, subscriber corporate network 117 may be connected to the GGSN 111 via a firewall 112; and the PLMN 115 may be connected to the GGSN 111 via a boarder gateway router 114. A Remote Authentication Dial-In User Service ("RADIUS") server 116 may be used for caller authentication when a user of a mobile cellular device calls corporate network 117, for example.

Generally, there may be four or more cell sizes in a GSM network—macro, micro, pico and umbrella cells. The coverage area of each cell may be different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 115, radio access network 120, core network 124 and interconnect network 137. The users area 115 may include a plurality of end users. The radio access network 120 may include a plurality of base station subsystems such as the BSSs 123, which include BTSs 121 and BSCs 122. The core network 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network 137 also may include networks and network elements. As illustrated in FIG. 1B, the interconnect network 137 may include a Public Switched Telephone Network ("PSTN") 133, a Fixed-End System ("FES") and/or the Internet 134, a firewall 135 and/or a Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

Any of the components described in relation to FIG. 1A may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 1A.

A processor may operate on computer-executable instructions that may be stored on a computer-readable medium (e.g., a memory, disk, etc.). Computer-executable instructions may include computer-readable instructions, for example machine code, byte code, script language, runtime code, and the like. The computer-executable instructions, when executed by the processor, may for example cause the processor to perform one or more parts of the functions and methods herein described.

In the following, depending on context, the term "mobile subscriber" may also refer to the actual portable device used by an end user of the mobile cellular service as well as the end user. When a mobile subscriber turns on a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may send an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

Any of the components described in relation to FIG. 1B may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 1B.

A processor may operate on computer-executable instructions that may be stored on a computer-readable medium (e.g., a memory, disk, etc.). Computer-executable instructions may include computer-readable instructions, for example machine code, byte code, script language, runtime code, and the like. The computer-executable instructions, when executed by the processor, may for example cause the processor to perform one or more parts of the functions and methods herein described.

FIG. 2 shows an example block diagram view of a GSM/GPRS/IP multimedia network architecture 138. As illustrated, the architecture 138 of FIG. 2 includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142. The MS 140 may be Mobile Equipment (ME), such as a mobile phone and/or a laptop computer that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTS 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 148, and an Equipment Identity Register (EIR) 149. The MSC 144 may perform a switching function for the network. The MSC may perform other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the mobile subscriber 140. For example, the Push Proxy Gateway (PPG) 152 may be used to "push" (i.e., send without a synchronous request) content to mobile subscriber 119. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first register with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provide a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time. A class C MS can attach for only one of the GPRS services and GSM services at a time. Simultaneous attachment and operation of GPRS services and GSM services is not possible with a class C MS.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while receiving data and vice versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provide flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

Any of the components described in relation to FIG. 2 may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 2.

A processor may operate on computer-executable instructions that may be stored on a computer-readable medium (e.g., a memory, disk, etc.). Computer-executable instructions may include computer-readable instructions, for example machine code, byte code, script language, runtime code, and the like. The computer-executable instructions, when executed by the processor, may for example cause the processor to perform one or more parts of the functions and methods herein described.

Figure 3:
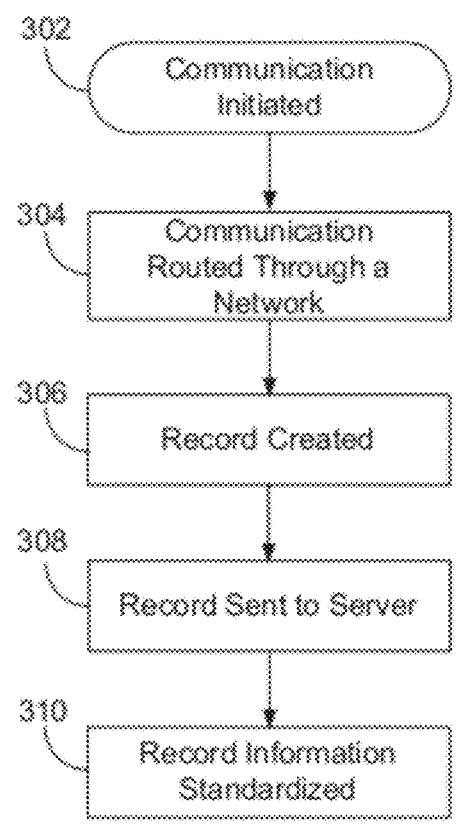
FIG. 3 illustrates an illustrative method of creating data relating to subscribers based on communications routed through a network.

FIG. 3 illustrates an illustrative method of creating a data record relating to a communication routed through a network. At 302, a communication may be initiated. For example, a phone call to/from a mobile subscriber may be initiated. Alternatively, a text message, a data message, or other type of non-voice communication may be initiated. Any type of communication may be initiated and may cause the creation of a data record relating to the communication. All such embodiments are contemplated as within the scope of the present disclosure.

At 304, the communication may be routed through a network. The communication may be a phone call routed through a network for transmitting phone calls, such as the networks described in relation to FIGS. 1A, 1B and 2. For example, the call may be received/switched at a cell tower and routed through a network; that is, there may be a switch associated with the cell tower that serves to switch the call along to its destination. (see FIG. 1B and FIG. 2 for example).

An example of a call routed through a cellular telephone network may be a call placed from one mobile subscriber to another mobile subscriber. Another example may be a call placed to/from a mobile subscriber from/to a land line phone. Still another example may be a call placed to/from a satellite phone from/to a mobile subscriber. That is, a network that switches cellular telephone calls may be involved whenever one of the parties on a call is a mobile subscriber.

Components of the network may create a data record. At 306, a record may be created relating to the communication. The record may contain multitudinous information fields that may include data relating to any type of communication. For example, the communication may be a phone call and the record may be a Call Detail Record (CDR). A CDR may include information such as the phone number placing the call (i.e., the originating phone number), the subscriber associated with the originating number, the phone number receiving the call (i.e., the target phone number), the subscriber associated with the target phone number, the duration of the call, cell tower information, RF interference encountered during the call, etc. For other types of communications, such as text messages and data messages, a communications record may be generated that may include information such as the phone number associated with one or both of the device originating the message and the intended recipient device, other identifying data (e.g., IP address, IMSI) associated with one or both of the device originating the message and the intended recipient device, a type of communication, any of the data that may be used in a CDR, etc.

The record may be created and/or recorded by routing components associated with routing the communication (e.g., BTS's 101, 102, 103, 123, 141, BSC's 122, 142, etc.). Using the phone call example, a CDR may be created or opened when a call connects with a cell tower where the call is passed through a switch. When the call is completed, the CDR may be closed, saved, and/or recorded in any manner. Further, there may be several different CDR's created, saved, and/or stored for any given call depending on packet types, transferring the call from one tower to another, etc. Further, the CDR may be created for purposes other than determining subscriber metrics (e.g., billing), which may avoid redundant creation of data.

At 308, the record may be sent to a server, e.g., a CDR may be sent to or retrieved by a server (CDR data may be streamed from a cell tower switch to a server). It will be appreciated that a record may be provided to or otherwise made available to a server on a real-time or non-real-time basis following its creation at 306. For example, a record may be included as part of a plurality of records provided in a batch to the server on a non-real-time basis. Likewise, because there may be many switching points in a network, CDR's may be forwarded to or retrieved by a server from many different locations. It should be noted that the routing function may be performed by any equipment capable of performing as herein described.

At 310, records may be normalized or standardized. For example, CDR information may be standardized. Standardization may be helpful because the server may receive multiple records that have different attributes, such as different formatting and/or non-standardized information fields. This may be likely to occur where records are sent to the server from different locations and/or types of equipment. For example, different switch manufacturers may have different standards for records.

Figure 4:
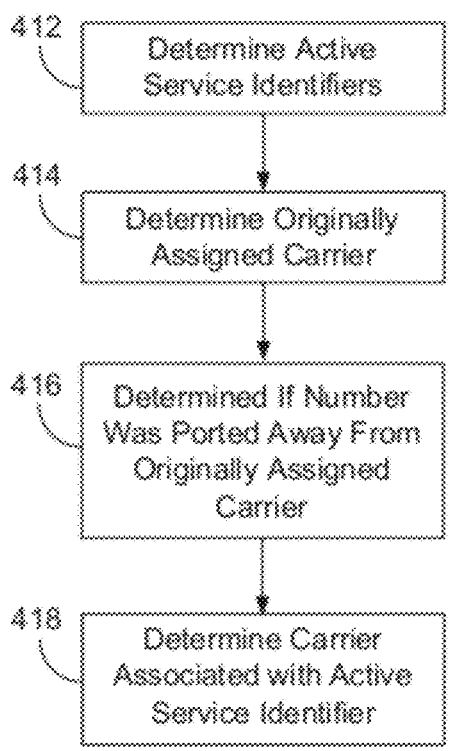
FIG. 4 illustrates an illustrative method to determine subscriber metric information.

FIG. 4 illustrates an illustrative method to determine subscriber metric information based on information in a record. At 412, an active service identifier(s) may be identified (e.g., the record may identify the active service identifier). The active service identifier may relate to a service provided by a carrier. For example, a phone number may be a service identifier associated with phone service provided by a carrier, an internet service user account number may be a service identifier of internet service provided by a carrier, etc. An active service identifier may refer to a service identifier that was used in association with the service for which a record was created. For example, a phone number may be identified as an originating number or a target number in a CDR associated with a switched call; and thus, the phone number may be an active phone number. That is, if a call originated from a mobile subscriber, the number associated with the originating mobile subscriber may be an active number. Likewise, if a call was received by a mobile subscriber, the number associated with the receiving mobile subscriber may be an active number. An active phone number may be an active service identifier.

An active service identifier may be compared to one or more databases to determine which carrier is associated with the active service identifier. In this way a number of active service identifiers associated with a given carrier may be determined. At 414-418, an example is illustrated using the phone call example. Note that similar activities may be performed to determine a number of active service identifiers associated with a given carrier using records relating to text, data, or any other type of communications.

At 414, for a phone number identified in a CDR, a determination may be made as to the carrier to which the number was first assigned. One way to determine the carrier originally assigned to a number is to compare the number with data from the Local Exchange Routing Guide (LERG). The LERG may include North American Numbering Plan (NANP) data. Such data may include information about the operating company numbers (OCNs) assigned to each carrier and the blocks of numbers associated with each OCN. Such blocks of numbers may be identified by the first six digits for each number within the block (which may be referred to as NPANXX). For example, a block of numbers may be associated with the digits 123-456, and the block may include all numbers from 123-456-0000 through 123-456-9999. Note that any other database or source of information may be used to determine carriers originally or currently associated with a particular telephone number. "Telephone number" as used herein may be a Mobile Subscriber Integrated Services Digital Network Number (MSISDN) or any other identifier, identifying number, or number otherwise associated with a subscriber, a mobile device, and/or a component of a mobile device such as a subscriber identity module (SIM) card.

The LERG, or any other database or information source configured with the appropriate data, may be used by a device and/or application to identify a carrier to which a particular block of numbers is assigned. By comparing a number to the LERG, a determination may be made as to which carrier was originally associated with the number.

At 416, a determination may be made as to whether the number was ported from the original carrier to another carrier. One way to determine whether a number was ported away from the originally assigned carrier may be to compare the number with Local Number Portability (LNP) data. Such data may be retrieved from or originate at the Number Portability Administration Center (NPAC) that tracks number porting changes for all carriers.

At 418, the carrier associated with the number may be determined. Still using the phone call example, if there is no record in the LNP data that a number has been ported, it may be assumed that the number may be associated with the originally assigned carrier. Likewise, if the LNP indicates that the number has been ported to a carrier, it may be assumed that the carrier listed in the LNP (i.e., the ported carrier) is the present carrier associated with the number.

The subscriber metric information gathered as described in FIG. 4 may be repeated for many switched communications identifying many active service identifiers. Further, data may be gathered for a particular period of time. For example, the data may be gathered daily, weekly, bi-monthly, monthly, etc. The time periods used for gathering and organizing the information is a matter of design choice.

By using active service identifiers as disclosed herein, it may be possible to reduce or eliminate researching unassigned or inaccurately labeled service identifiers. Referring back to the example of the phone call, because the prior art uses blocks of assigned numbers that may or may not be active and may or may not be correctly assigned, resources are wasted. Because the methods herein described do not research active service identifiers that may be inactive or incorrectly assigned, the disclosed subject matter may be more efficient than the prior art.

Moreover, by using active service identifiers that are associated with actual received requests for service, other types of communications that are not necessarily associated with active devices are not used and therefore do not introduce error into metrics. For example, mobile devices that are turned on and communicating with a network, for example, by transmitting and/or receiving keepalive traffic, but that are not subscribed to any carrier or otherwise not able to engage in communications with other end user devices will not be counted in subscriber metrics.

The presently disclosed embodiments may reduce error introduced by statistical analysis. Because data may be gathered for a high percentage of active service identifiers, the error introduced by estimating subscriber metrics from only a small amount of data may be reduced.

The present embodiments may also make it easier for a carrier to perform its own analysis and may avoid using a third party that does not have in-depth knowledge of the carrier's marketing goals and may have conflicts of interest with the carrier (e.g., conflicts arising from providing subscriber metrics to multiple carriers).

Referring back to 304 in FIG. 3, and using the phone call example, CDR information is created for calls that interact with a network. There is a multiplication effect for carriers that route calls. That is, a carrier can access information not only for subscribers associated with the carrier, but also from other subscribers associated with other carriers. For example, consider a call from one mobile subscriber associated with a first carrier to another mobile subscriber associated with a second carrier. The call may be routed at some point by the first carrier to the second carrier. Further, the first carrier may have access to information about both subscribers from the CDR. Thus, the first carrier may receive information for more than just its own subscribers. Due to the multiplication effect, large carriers may be able to access information for a large majority of active subscribers.

In the disclosed embodiments, the data on active service identifiers is generated as communications are routed. Thus, separate SS7 queries are not needed, and therefore fewer computing resources may be needed. In addition, a carrier may not add additional load to networks by making SS7 queries.

Figure 5:
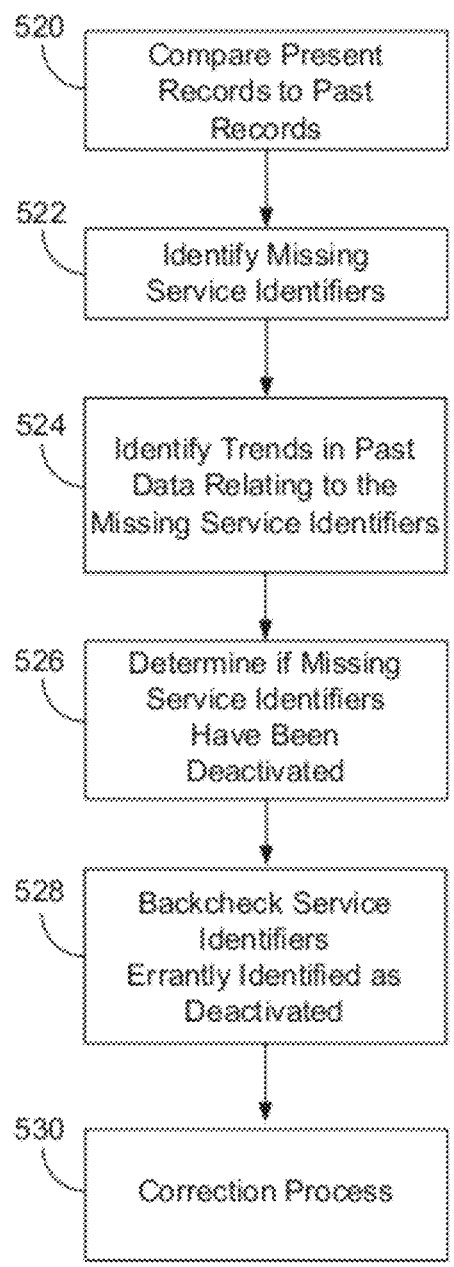
FIG. 5 illustrates an illustrative method to determine deactivations.

Additional features may be added to the methods described in relation to FIG. 4 in order to track additional subscriber information. For example, FIG. 5 illustrates an illustrative method to determine deactivations.

At 520, present records may be compared to past records, e.g., present CDR data may be compared to past CDR data. For example, a phone number may have been an active phone number in previous data sets as indicated by past CDR's. However, the phone number may not appear in the current data set.

At 522, service identifiers may be identified that were in previous data sets, but not in current data sets, e.g., phone numbers may be identified that were in previous data sets, but not in current data sets (i.e., missing numbers). For example, CDR data sets may be available for the first four weeks of a year. A number may have been present in one or more of weeks one through three. However, the number may not be present in the CDR data set for week four.

At 524, trends may be identified in past data for service identifiers. The identified trends may aid in assessing deactivations. At 526, a determination may be made as to whether the identified service identifiers have been deactivated. Statistical analysis, algorithms and/or set thresholds may be used to determine if an identified service identifiers has been deactivated.

Consider the following examples relating to phone calls, but which can also be generalized for other communications, including text messages and data messages. For numbers showing no activity for two weeks, the number may be considered deactivated if the number was used to make and/or receive more than a threshold number of calls (e.g., 20 calls per week) for the three months prior to inactive period. Another rule may be used for numbers that may have been inactive for four weeks, but may not have been classified as deactivated by the two week data. For example, for numbers showing no activity for four weeks, the number may be considered deactivated if the number was used to make and/or receive more than a threshold number of calls per month (e.g., 10 calls per month) for the three months prior to inactive period. Another rule may be used for numbers that may have been inactive for twelve weeks, but may not have been classified as deactivated by the two or four week data. For example, for numbers showing no activity for twelve weeks, the number may be considered deactivated if the number was used to make and/or receive more than a threshold number of calls per quarter (e.g., 10 calls per quarter) for the three months prior to inactive period.

The foregoing examples are matters of design choice. Irrespective of the design choice, a carrier may set rules to determine deactivations from trends in records, such as CDR data.

At 528, a backcheck of service identifiers errantly identified as deactivated may be performed. Using the phone call example, a number may have been identified as deactivated (e.g., a number may have satisfied one of the above examples). However, the number previously identified as deactivated in an earlier time period may be listed in the present data set as an active number, still associated with the same subscriber and the same carrier as the last time it was active (e.g. calling patterns are the same). Thus, the number may have been errantly identified as deactivated.

Time limits may be placed on the amount of time that passes for a service identifier to still be considered errantly identified as deactivated. For example, if a year passed with no activity from the service identifier, the service identifier may not be considered errantly identified as deactivated.

At 530, a correction process may be performed. The correction process may base a correction on such things as trends in record data or service identifiers errantly identified as deactivated at 528. Using the phone call example, trends in CDR data may reveal that a certain month may have many more numbers without activity than other months, increasing the chance of errantly identifying numbers as deactivated. Adjustments may be performed to make an allowance for such a trend. A correction process may be performed to adjust the determination at 526 to be less stringent (i.e., require a passage of more time before a service identifier is identified as deactivated).

Another example may be a phone number that has only sporadic activity with lengthy periods of inactivity between uses. Such a mobile subscriber may be a "glove box user," that is, a mobile subscriber that may keep a phone for emergencies or specific functions and does not use the number in a consistent way. If a number is identified as being used only in such a sporadic manner, a correction process may be performed to adjust the determination at 526 to be less stringent or to remove the number from consideration as a deactivated number.

The foregoing examples are matters of design choice. Irrespective of the design choice, records may be used to identify trends to make corrections to the process.

Figure 6:
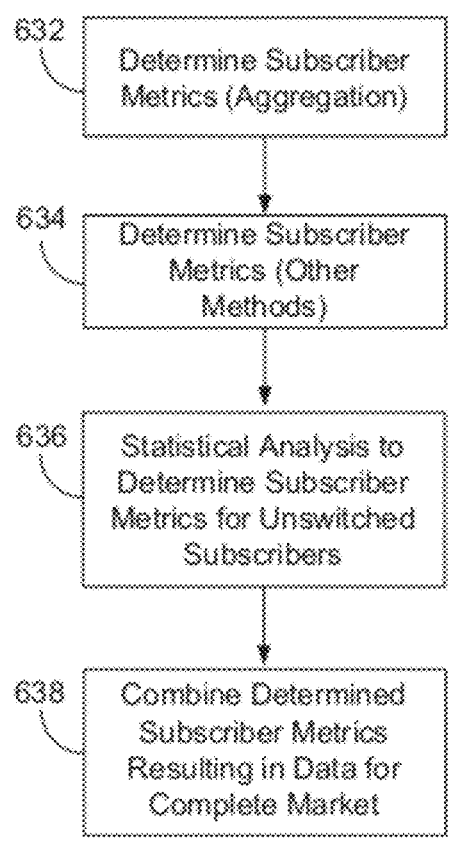
FIG. 6 illustrates illustrative methods to determine subscriber metrics.

FIG. 6 illustrates methods to determine subscriber metrics by aggregating data. At 632, subscriber metrics may be determined for active service identifiers. Referring back to FIG. 4, at 412-418 subscriber metric information is determined (e.g., a carrier associated with an active service identifier is identified).

At 632, carrier determinations may be aggregated to provide a number of service identifiers/subscribers associated with a given carrier. For example, the determination made in FIG. 4 (e.g., at 418) may be repeated for a large amount of communications. The large amount of communications may identify a large amount of active service identifiers. As illustrated in FIG. 4, a carrier associated with each of the active service identifiers may be identified. Further, each of the active service identifiers associated with a first carrier may be aggregated. That is, by adding together each subscriber associated with the first carrier, a number of subscribers associated with the first carrier may be determined. Likewise, each of the active service identifiers associated with a second carrier may be aggregated resulting in a number of subscribers associated with the second carrier. This process may be repeated for other carriers. The carrier subscriber data may be used to determine other subscriber metrics.

The carrier subscriber data may also be used to determine a market share for a carrier. For example, a market share for the first carrier may be determined by calculating the ratio of the number of subscribers associated with the first carrier in a market to a total number of subscribers in the market (e.g., the total number of unique subscribers or unique active service identifiers identified in the communication records).

At 634, subscriber metrics may be determined based upon analysis of present record data compared to past record data. For example, FIG. 5 illustrates determining a deactivation based on such data. By aggregating such data, subscriber metrics may be created for absolute numbers of deactivations per carrier, percentage of deactivations per carrier, etc.

At 636, statistical analysis and/or extrapolation of the subscriber metrics determined at 632 and/or 634 may be used to calculate subscriber metrics for the rest of a market (e.g., national market, regional market, local market, micromarket, etc.). At 632 and/or 634, subscriber metrics may have been calculated for a market. However, the subscriber metrics calculated at 632 and/or 634 may provide data for active service identifiers that were identified by switched communications. There may be other active service identifiers in the market that were not switched on the network at which the record data was generated. That is, the subscriber metrics calculated at 632 and/or 634 may represent less than all of the active service identifiers/subscribers in a given market.

Statistical analysis may be performed on the data collected in order to estimate subscriber metrics for the part of the market not identified in communications switched by the network. The statistical analysis may be as simple as extrapolating from the numbers calculated at 632 and/or 634 using detailed algorithms. As an example of the statistical analysis that may be employed, algorithms may be used to estimate activity levels of non-measured subscribers. Results may be reconciled against historical patterns or national reported carrier data for example, thus, subscriber metrics for a market can be provided. The methods used to estimate subscriber metrics for the remaining active service identifiers (i.e., active service identifiers that were not routed through the network) is a matter of design choice. Irrespective of design choice, the data at 632 and/or 634 may be processed to estimate data for active service identifiers that were not switched by a carrier's network.

At 638, the subscriber metrics determined at 632, 634 and/or 636 may be combined to provide subscriber metrics. For example, at 632 the number of subscribers per carrier may be calculated for switched communications in a market (e.g., communications that were switched by a carrier's network). At 636, the number of subscribers per carrier may be calculated for active service identifiers that were not identified by switched communications in a market. The data at 632 and 636 may be combined to provide the total number of subscribers per carrier in a market. Further, a market share for a given carrier may be calculated (e.g., a market share for a first carrier may be determined by calculating the ratio of the number of subscribers associated with the first carrier in a market to a total number of subscribers in the market, which in an embodiment may be determined from the total number of unique subscribers or unique active service identifiers identified in communication records).

It may be difficult to measure an total number of active subscribers in a market directly regardless of the size of the carrier network from which direct capture of service requests and/or active service identifiers is performed. Therefore, in an embodiment, an initial count of subscribers for a particular carrier in a first area may be adjusted by a percentage factor. Such a percentage factor may be determined by comparing a count of subscribers for the particular carrier for a second area to a publicly reported count of subscribers for the particular carrier for the second area to determine a percentage difference between the two second area counts. The percentage difference may be used to adjust the initial count of subscribers for the particular carrier in the first area to obtain a more accurate count of actual subscribers for the particular carrier in the first area. The second area may be larger than the first area, or the first area may be larger than the second area. Alternatively, the first and second areas may be of equal or approximately equal size.

Figure 7:
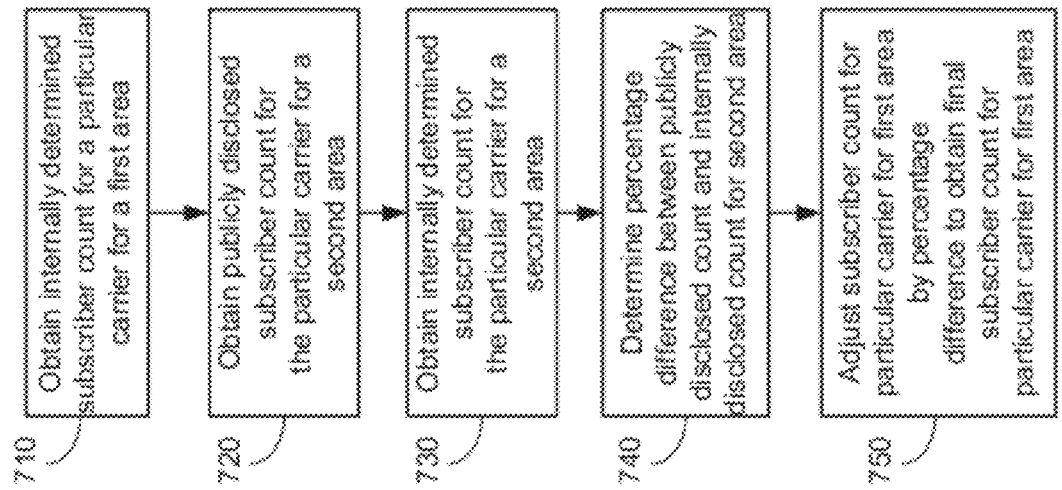
FIG. 7 illustrates another illustrative method to determine subscriber metric information.

FIG. 7 illustrates an illustrative non-limiting method of implementing such an embodiment. At block 710, an internally determined count of subscribers for a particular carrier for a first area may be obtained using any means and/or system described herein, any other means and/or system, or any combination thereof This count may be a count of unique subscribers associated with a particular carrier for the first area. At block 720, a publicly disclosed count of subscribers for a particular carrier for a second area may be obtained. The publicly disclosed count may be obtained or derived from a subscriber count disclosed by the particular carrier itself through typical channels, or a subscriber count disclosed by industry analysis, news reporting, or any other source. At block 730, an internally determined subscriber count for the particular carrier for the second area may be obtained. This count, like that for the first area, may be obtained using any means and/or system described herein, any other means and/or system, or any combination thereof. At block 740, the percentage difference between the publicly disclosed count of subscribers for the particular carrier for the second area the internally determined subscriber count for the particular carrier for the second area may be determined. At block 750, the subscriber count for the particular carrier for the first area may be adjusted by the percentage difference determined at block 740.

A non-limiting example will now be provided to help clarify the method of FIG. 7. An accurate number of subscribers for a particular carrier in a particular market area (e.g., a city, a state, etc.) may be desired. A count may be made (according to any embodiment disclosed herein or otherwise) of subscribers for the particular carrier in the particular market area. An internal count may also be made of subscribers for the particular carrier nationwide (according to any embodiment disclosed herein or otherwise). This internal count may be compared to the particular carrier's announced subscriber count and a percentage difference may be determined For example, it may be determined that the particular carrier is claiming to have 20% more subscribers than is indicated by the internal count. Thus, to obtain a more accurate subscriber count for the particular carrier in the particular market area, the count made of subscribers for the particular carrier in the particular market area may be increased by 20%.

In another embodiment, a capture/recapture method may be used to determine subscriber counts for a particular carrier in a particular area. Such a method may estimate a carrier's subscriber count by comparing the relative proportions of unique active service identifiers (and therefore subscribers) captured in successive samples. For example, a first count of subscribers for a particular carrier in a particular area (according to any embodiment disclosed herein or otherwise) may be obtained during a first time frame. A second count of subscribers for the same particular area may be obtained during a second time frame. An amount of overlap may then be determined, which may be the number of unique subscribers appearing in both counts. To determine the subscriber count estimate, the two counts are multiplied by each other and then divided by the overlap.

Figure 8:
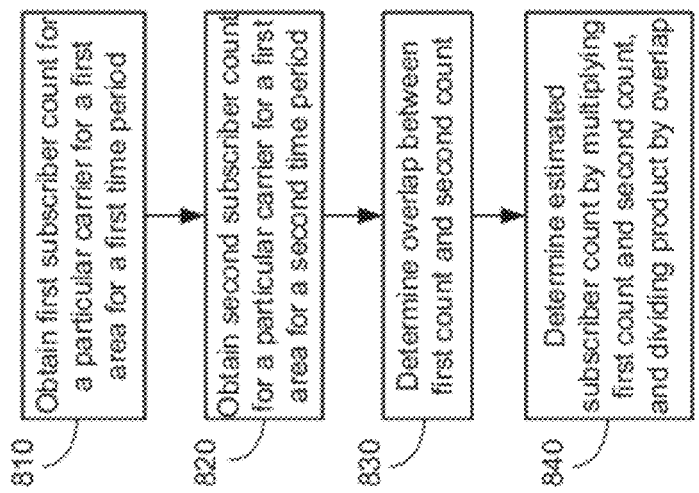
FIG. 8 illustrates another illustrative method to determine subscriber metric information.

FIG. 8 illustrates an illustrative non-limiting method of implementing such an embodiment. In the description of FIG. 8, example subscriber count numbers will be used. This example is for illustrative purposes only and is not to be construed to be limiting in any way.

At block 810, a first count of subscribers for a particular carrier for a first area may be obtained for a first time period using any means and/or system described herein, any other means and/or system, or any combination thereof. This count may be a count of unique subscribers associated with a particular carrier for the first area during the first time period. The first time period may be any time period, such as a day, a week, a month, a year, etc. In an illustrative example, the first count may be 8,700 subscribers. At block 820, a second count of subscribers for a particular carrier for the first area may be obtained for a second time period using any means and/or system described herein, any other means and/or system, or any combination thereof This count may be a count of unique subscribers associated with a particular carrier for the first area during the second time period. The second time period may be a time period distinct from the first time period, and may be any time period, such as a day, a week, a month, a year, etc. Continuing the illustrative example, the second count may be 8,500 subscribers. In an embodiment, the first time period and the second time period are the same length of time and occur at different times. For example, the first time period may be January of a particular year, and the second time period may be February of the same year. Any combination of time periods, of similar or different lengths, is contemplated as within the scope of the present disclosure.

At block 830, the overlap of subscribers between the first count and the second count may be determined The overlap may be the number of subscribers that are counted in both the first count and the second count. Continuing the illustrative example, the overlap between the first count and the second count may be 7,500 subscribers. At block 840, the estimated subscriber count may be determined by multiplying the first count by the second count, and dividing the product of the first count and the second count by the overlap. Continuing the illustrative example, the estimated subscriber count may be determined by multiplying 8,700 (first count) by 8,500 (second count), and then dividing the product by 7,500 (overlap) to give an estimated 9,860 subscribers:

$$(8,700 \times 8,500) \div 7,500 = 9,860$$

In an embodiment, the method of FIG. 8 may be performed on a "rolling" basis, with the method being performed following each successive time period in order to keep a current estimate of subscribers. For example, at the end of every month, week, or other time period, the method of FIG. 8 may be performed using the most recently ended time period and the next most recently ended time period to obtain up to date estimates of subscriber counts. The estimate generated by this embodiment may be further adjusted, including as disclosed herein, to account for new additions and/or new disconnections.

In an embodiment, the quantity and frequency of interaction with a network may be used to determine if a particular phone number or other device or subscriber identifier is for a new subscriber or a recently disconnected subscriber. Such a determination may be based on service request records and/or data, such as CDRs. For example, if a telephone number associated with a mobile device appears in one or more CDRs in one time periods and has not been detected in any of the previous such time periods, this number may be determined to be associated with a new subscriber for the carrier associated with the number. Similarly, if a number that has repeatedly appeared in CDRs for the past several time periods is no longer detected, this number may be determined to be disconnected or no longer a subscriber to a particular carrier.

Figures 9, 10:
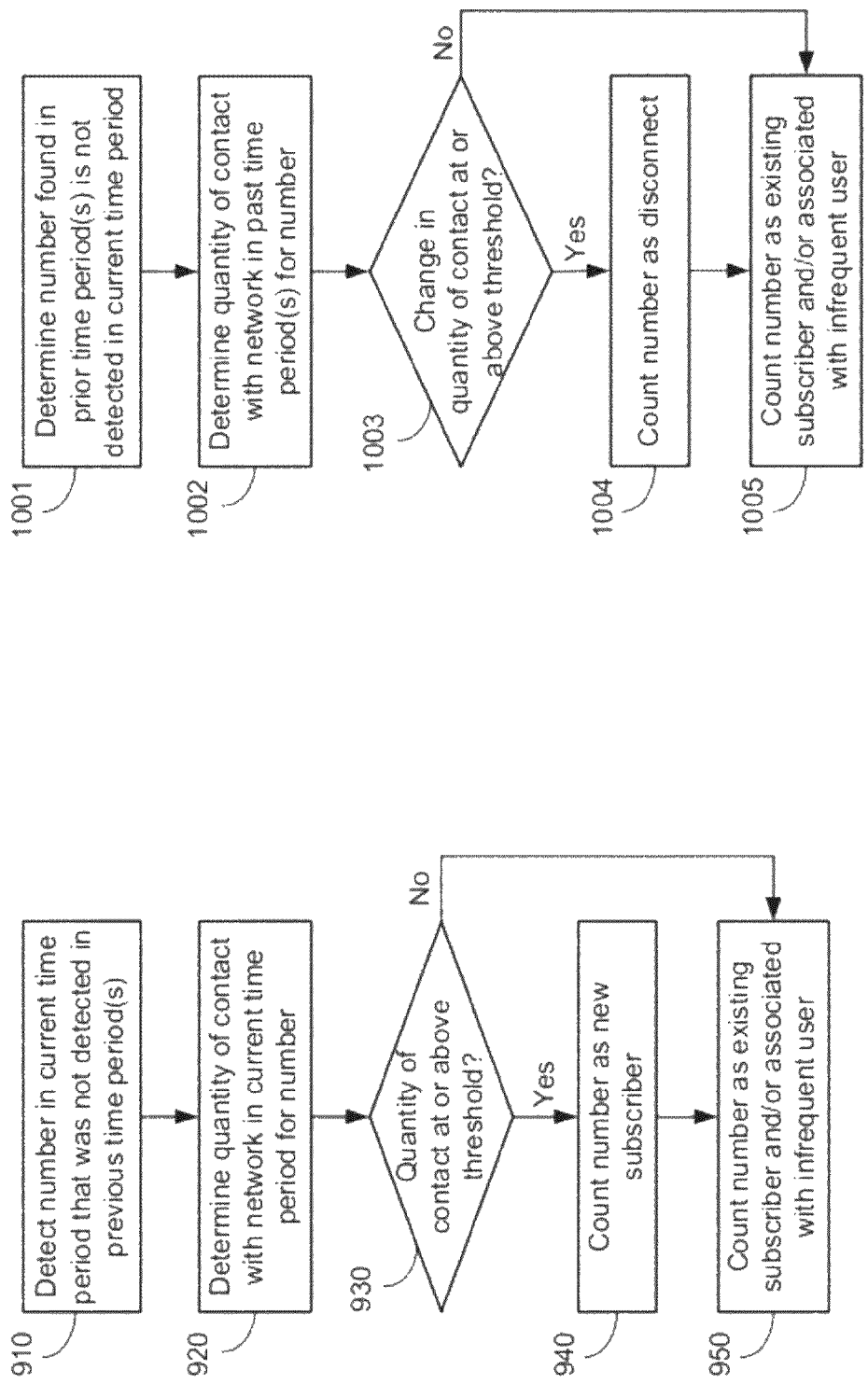
FIG. 9 illustrates an illustrative method to determine newly added subscriber metric information.
FIG. 10 illustrates an illustrative method to determine disconnected subscriber metric information.

Threshold values may be used to determine whether to count a particular number as a new subscriber or recent disconnect. FIG. 9 illustrates an illustrative non-limiting method of implementing such an embodiment to determine whether a newly detected telephone number is a new subscriber. In the description of FIG. 9, an example using example values for time periods will be used. This example is for illustrative purposes only and is not to be construed to be limiting in any way.

At block 910, in analyzing records for a current time period (e.g., most recently ended time period or time period of current interest) a number may be detected that was not found in one or more time periods prior to the current time period. For example, a number may be detected in the records for the most recently ended month that was not seen in the previous six months' records. The records of any number of time periods may be compared to a more recent time period to determine if the number is newly detected.

At block 920, a determination may be made as to the quantity of contact with the network the newly detected number has had. For example, it may be determined that in the past month, 20 calls or requests for service have been detected. This may indicate that the newly detected number is associated with a new subscriber who will be regularly using the network at a similar rate. Alternatively, it may be determined that the newly detected number transmitted only one request for service in the past month. This may indicate that the newly detected number is associated with a very infrequent user of a mobile device, and therefore is not actually associated with a new subscriber.

At block 930, a determination may be made as to whether the quantity of contact meets or exceeds a threshold. The threshold may be any value that may be used to determine whether a newly detected number is associated with a new subscriber or an infrequent user. For example, it may be determined that less than three attempts to place a call or otherwise request service may indicate that the associated number is an infrequent user, while three or more attempts to place a call or otherwise request service may indicate that the associated number is for a new subscriber. If it is determined that the quantity of network contact meets or exceeds the threshold, the newly detected number may be counted as a new subscriber at block 940. If the quantity of network contact is below the threshold, the newly detected number may counted as an infrequent user at block 950, or alternatively not counted in a particular category, or in another alternative counted merely as an existing subscriber.

FIG. 10 illustrates an illustrative non-limiting method of implementing an embodiment to determine whether a telephone number is associated with a disconnected subscriber. In the description of FIG. 10, an example using example values for time periods will be used. This example is for illustrative purposes only and is not to be construed to be limiting in any way.

At block 1001, in analyzing records for a current time period (e.g., most recently ended time period or time period of current interest) a number may not be detected that was detected in one or more time periods prior to the current time period. For example, a number may not be detected in the records for the most recently ended month after it was detected during each of the previous six months' records. The records of any number of time periods may be compared to a more recent time period to determine if the number has been previously detected.

At block 1002, a determination may be made as to the quantity of contact with the network the newly missing number had. For example, it may be determined that in month prior to the most recent month, more than 20 calls or requests for service have been detected. This may indicate that the newly missing number was associated with a subscriber who regularly used the network, but is now not using it at all. Alternatively, it may be determined that the newly missing number had transmitted only a two requests for service over the past six months. This may indicate that the newly missing number is associated with a very infrequent user of a mobile device, and therefore is not actually associated with a now disconnected subscriber.

At block 1003, a determination may be made as to whether the change in the quantity of contact over the analyzed time periods meets or exceeds a threshold. The threshold may be any value that may be used to determine whether a newly missing number is associated with a disconnected subscriber or an infrequent user. For example, it may be determined that a change of one call a month the previous three months to no calls for the most recent month may indicate that the associated number is an infrequent user but likely not disconnected, while a change from 20 calls a month on average to no calls in the most recent month may indicate that the newly missing number is associated with a disconnected subscriber. If it is determined that change in the quantity of network contact meets or exceeds the threshold, the newly missed number may be counted as a subscriber disconnect at block 1004. If the change in the quantity of network contact is below the threshold, the newly missing number may counted as an infrequent user at block 1005, or alternatively not counted in a particular category, or in another alternative counted merely as an existing subscriber.

In an embodiment, the determinations of added subscribers and disconnected subscribers may be verified by comparison to publicly disclosed numbers of added and disconnected subscribers issued by carriers and/or other channels of information distribution. If the publicly disclosed numbers of added and disconnected subscribers are for a large area, for example, nationwide, then numbers for smaller areas, such as city or state markets, may be adjusted based on the publicly disclosed numbers, in one embodiment as disclosed herein including using method similar to that of FIG. 7.

Figure 11:
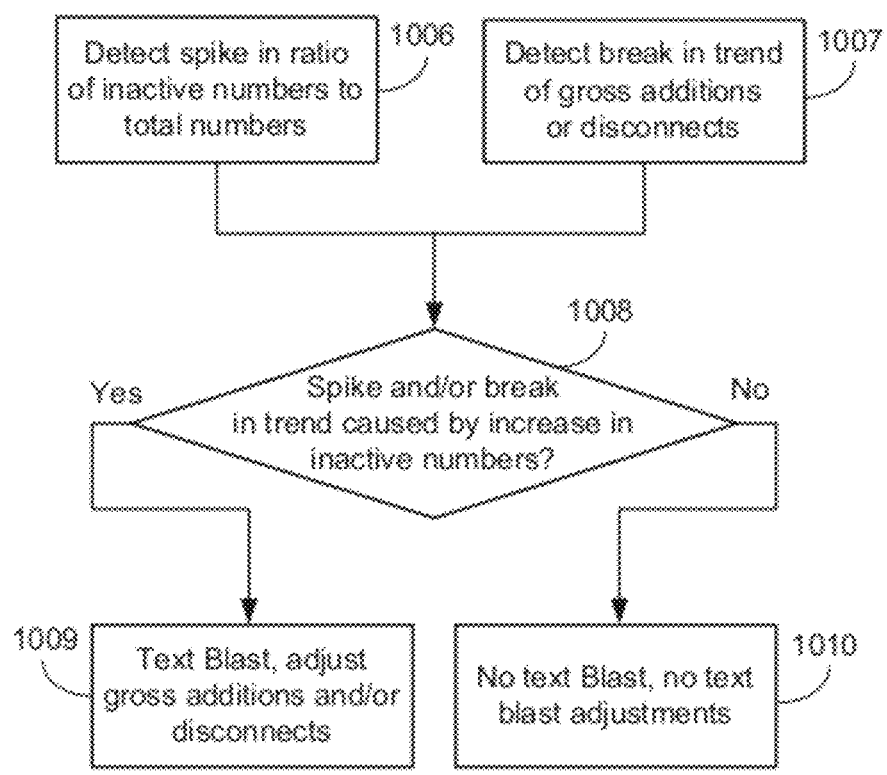
FIG. 11 illustrates an illustrative method to determine subscriber metric information following a text blast.

FIG. 11 shows an example illustrative non-limiting method of implementing an embodiment to determine whether telephone numbers associated with a text blast are active telephone numbers and removing such numbers from subscriber data. A "text blast" may occur when one device contacts a high number of recipients by sending such recipients a message, such as a text message. Alternatively, a text blast may be an occurrence of a large number of messages, each addressed to a different telephone number, that originate from a single telephone number. A text blast may be directed to all numbers within a block of telephone numbers, such as a block of numbers associated with an OCN. Alternatively, a text blast may be location based. For example, many numbers associated with a particular geographical location may be recipients of a text blast. The originating number and the recipient numbers may be on the same carrier, on different carriers, or some of the recipients may be on one or more different carriers than the originating number while some of the recipients may be on the same carrier as the originating number. Since a text blast may involve sending a message to all numbers within a block of numbers, many, and possibly most, of the recipient numbers could be inactive telephone numbers. Thus, it may be desirable to remove such inactive recipient numbers from any data that is used to determine subscriber metrics.

At block 1006, a spike in a ratio of inactive telephone numbers to total telephone numbers for a particular carrier may be detected. For example, if the percentage of inactive telephone numbers to total detected telephone numbers for an area (e.g., a geographical area) during a current time period has risen above a threshold difference when compared to a previous time period, it may be determined that a text blast may have been detected. While in an embodiment the current ratio or percentage of inactive telephone numbers to total detected telephone numbers for an area may be compared to the next most recent ratio or percentage for that area, any two or more ratios or percentages may be compared. Also note that the threshold may be set to any value, including a default value or a predetermined value, and may be adjusted based on any criteria.

At block 1007, a break in a trend of gross additions or disconnections of subscribers for a particular carrier may be detected. In the course of determining subscriber metrics, trends may be detected and/or determined for particular carriers. For example, it may be determined that one particular carrier is seeing an average of a five percent increase in subscribers each month in a particular area. If the trend in a subsequent month jumps above a threshold, it may be determined that a text blast may have occurred. Here again, note that the threshold may be set to any value and may be adjusted based on any criteria. Also note that the activities and functions of block 1006 and 1007 may be performed concurrently, separately, or one or the other of blocks 1006 and 1007 may be performed alone. All such embodiments are contemplated as within the scope of the present disclosure.

At block 1008, a determination may be made as to whether the spike in a ratio of inactive telephone numbers to total telephone numbers and/or the break in a trend of gross additions or disconnections of subscribers is due to an increase in inactive numbers. Note that any other activities that indicate a level of traffic that is outside of a determined normal level of traffic may trigger the evaluation at block 1008. If the spike, break in trend, or other detected activity is determined to be due to an increase in inactive numbers, at block 1009 it may be determined that a text blast has occurred, and gross additions and/or disconnections may be adjusted, for example, by removing the inactive telephone numbers associated with the text blast from the determined gross additions for that particular carrier. In an embodiment, each recipient number associated with a text blast may be evaluated to determine if that number has had any other interaction with the network. If not, the particular number may be marked or otherwise noted as inactive and may be removed from the determined total of gross additions for the carrier associated with the number. Alternatively, it may be determined whether each recipient number associated with a text blast has only been the recipient number for text messages (as opposed to an origination number) and/or has only been the recipient number for telephone call requests and no call requests have been answered. If so, such numbers may be indicated as inactive and may be removed from the determined total of gross additions for the carrier associated with the number.

In either such embodiment, and any other embodiments set forth herein, any device within a carrier's network may be queried to determine whether any interactions have occurred involving a suspected inactive telephone number and to obtain the details of such interactions. Call details records and/or any other data may be used to determine such interactions. In another embodiment, an HLR may be queried for such data. Note that any of the embodiments described herein and any other means or methods for determining whether a telephone number is an active or inactive telephone number, as well as any combinations thereof, may be used in determining whether numbers associated with a text blast are active or inactive.

If the break in the trend and/or the spike in a ratio or percentage of inactive telephone numbers to total telephone numbers is not due to an increase in inactive numbers, for example when the spike or break in the trend is due to actual subscriber additions or the release of a new product or feature, at block 1010 it may be determined that no text blast has occurred and no text blast adjustments may be made to gross additions and/or disconnections.

The results of any analysis performed using any of the systems and methods described herein may be further refined by determining additional characteristics of the analyzed records and further categorizing the subscribers associated with the records. For example, once a number of subscribers, a number of new subscribers, or a number of disconnected subscribers is determined, further data may be determined for each set of subscribers and used for additional analysis. Billing, call, and other carrier records may be used to determine demographic data of subscribers, typical utilization levels of subscribers, communications plan selections of subscribers, etc.

For example, upon determining a market share for a particular carrier in a particular market, geographical destinations of calls may be determined from call records associated with the subscribers associated with that carrier. From this data, a percentage or number of subscribers that are frequent international callers, for example, may be determined This may indicate that this group of subscribers are recent immigrants or heavy international services users. This data may instead be used to determine the primary language of such subscribers, which may assist in marketing efforts. For example, a percentage of subscribers for a particular carrier that frequently call Spanish speaking countries may be determined, and that data may be used for various additional analysis and decision-making, such as the allotment of marketing resources.

Alternatively, demographic information from other sources, such as census information, market area surveys, etc. may be compared to communications record data to determine demographic information for subscribers. For example, addresses from billing records for subscribers associated with a particular carrier in a particular market (e.g., by analysis of communication records) may be overlaid on census data to determine a likely ethnicity, household income, primary spoken language, etc. for such subscribers. This resulting data may then be used for various additional analysis and decision-making, such as the allotment of marketing resources.

Figure 12:
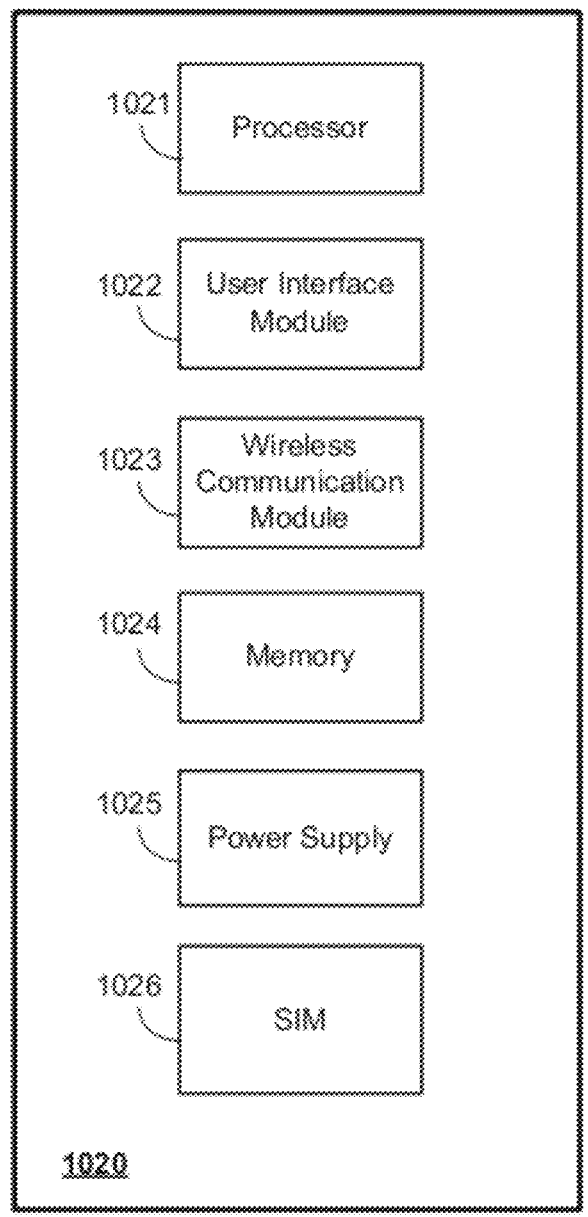
FIG. 12 is a block diagram of a non-limiting illustrative mobile device in which embodiments of the present disclosure may be implemented.

FIG. 12 illustrates an example wireless device 1020 that may be used in connection with an embodiment. References will also be made to other figures of the present disclosure as appropriate. For example, any of the subscribers described herein may be associated with or operating a wireless devices of the type described in regard to FIG. 12, and such devices may have some, all, or none of the components and modules described in regard to FIG. 12. It will be appreciated that the components and modules of wireless device 1020 illustrated in FIG. 12 are illustrative, and that any number and type of components and/or modules may be present in wireless device 1020. In addition, the functions performed by any or all of the components and modules illustrated in FIG. 12 may be performed by any number of physical components. Thus, it is possible that in some embodiments the functionality of more than one component and/or module illustrated in FIG. 12 may be performed by any number or types of hardware and/or software.

Processor 1021 may be any type of circuitry that performs operations on behalf of wireless device 1020. Such circuitry may include circuitry and other components that enable processor 1021 to perform any of the functions and methods described herein. Such circuitry and other components may also enable processor 1021 to communicate and/or interact with other devices and components, for example any other component of device of wireless device 1020, in such a manner as to enable processor 1021 and such other devices and/or components to perform any of the disclosed functions and methods. In one embodiment, processor 1021 executes software (i.e., computer readable instructions stored in a computer readable medium) that may include functionality related to determining subscriber metrics, for example. User interface module 1022 may be any type or combination of hardware and/or software that enables a user to operate and interact with wireless device 1020, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1020 to communicate with wireless network equipment. Memory 1024 enables wireless device 1020 to store information, such as text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1020. SIM 1026 may be any type Subscriber Identity Module and may be configured on a removable or non-removable SIM card that allows wireless device 1020 to store data on SIM 1026.

Figure 13:
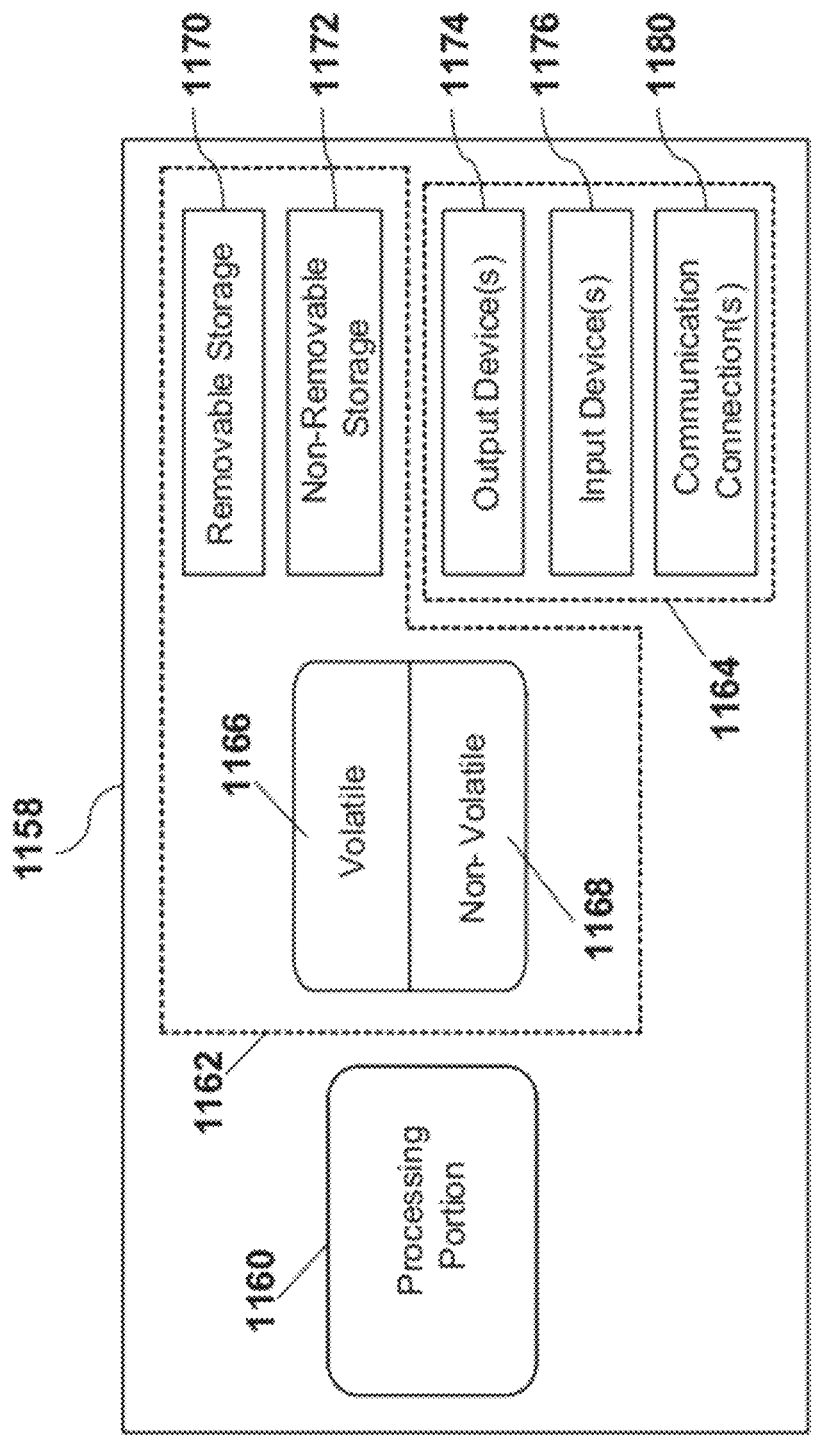
FIG. 13 is a block diagram of a non-limiting illustrative processor in which embodiments of the present disclosure may be implemented.

FIG. 13 is a block diagram of an example processor 1158 which may be employed in any of the embodiments described herein, including as one or more components of a mobile devices operated by a subscriber, as one or more components of network equipment that may detect and process requests for network resources such as call requests, any other component of networks described herein, and/or any related equipment, and/or as one or more components of any third party system or subsystem that may implement any portion of the subject matter described herein. It is emphasized that the block diagram depicted in FIG. 13 is illustrative and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 13, the processor 1158 comprises a processing portion 1160, a memory portion 1162, and an input/output portion 1164. The processing portion 1160, memory portion 1162, and input/output portion 1164 are coupled together (coupling not shown in FIG. 13) to allow communications between these portions. The input/output portion 1164 is capable of providing and/or receiving components, commands, and/or instructions, utilized to, for example, request and receive call requests and other service requests, establish and terminate communications sessions, transmit and receive service request responses and data access request data and responses, transmit, receive, store and process text, data, and voice communications, execute software that processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing service requests, radio resource requests, QoS and/or access point name parameters, software for a subscriber metrics determination and analysis, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other tangible medium that may be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Reference is made herein to the methods being performed by a carrier with a network. However, the systems and methods disclosed herein are not limited to implementation by a single carrier with a single network. For example, multiple carriers may share data. Further, a single carrier may have access to more than its own network.

Reference is made herein to records generated and used in order to provide subscriber metrics. The creation of subscriber metrics as herein described may be for particular periods of time. For example, records may be created during a two week period. Further, subscriber metrics may be created from the records, thus, providing subscriber metrics for that two week period. The time periods used for gathering and organizing the information is a matter of design choice.

What is claimed is:

1. A method comprising:
   determining a number of first detected subscribers for a first time period;
   determining a number of second detected subscribers for a previous time period;
   comparing a difference between the number of first detected subscribers and the number of second detected subscribers to a threshold;
   determining, based at least in part on the comparing, that a subset of the first detected subscribers is inactive; and
   removing a count of the subset of the first detected subscribers from a count of active subscribers for a carrier.

2. The method of claim 1, wherein determining that the subset of the first detected subscribers is inactive comprises determining that each of the subset of the first detected subscribers has had no other interaction with a network during a predetermined time period.

3. The method of claim 1, wherein determining that the subset of the first detected subscribers is inactive comprises determining that each of the subset of the first detected subscribers has not answered a request to establish a telephone call.

4. The method of claim 1, wherein comparing the difference between the number of first detected subscribers and the number of second detected subscribers to the threshold comprises:
   determining a first ratio of first inactive subscribers to first total subscribers detected for the carrier for the first time period;
   determining a second ratio of second inactive subscribers to second total subscribers detected for the carrier for the previous time period; and
   determining that the difference between the first ratio and the second ratio exceeds the threshold.

5. The method of claim 1, wherein comparing the difference between the number of first detected subscribers and the number of second detected subscribers to the threshold comprises:
   determining an expected number of first detected subscribers for the first time period; and
   determining that the difference between the number of first detected subscribers for the first time period and the expected number of first detected subscribers for the first time period exceeds the threshold.

6. The method of claim 5, wherein the expected number of first detected subscribers for the first time period is determined based on a plurality of numbers of detected subscribers for a plurality of previous time periods.

7. The method of claim 1, further comprising determining that a second subset of the first detected subscribers comprises recipients of a text message originating at one device.

8. A system comprising:
   at least one memory; and
   at least one processor in communication with the at least one memory, wherein the at least one processor is configured to:
   determine a number of first detected subscribers for a first time period;
   determine a number of second detected subscribers for a previous time period;
   compare a difference between the number of first detected subscribers and the number of second detected subscribers to a threshold;
   determine, based at least in part on the comparison of the difference to the threshold, that a subset of the first detected subscribers is inactive; and
   remove a count of the subset of the first detected subscribers from a count of active subscribers for a carrier.

9. The system of claim 8, wherein the at least one processor is configured to determine that the subset of the first detected subscribers is inactive by determining that each of the subset of the first detected subscribers has had no other interaction with a network.

10. The system of claim 8, wherein the at least one processor is configured to determine that the subset of the first detected subscribers is inactive by determining that each of the subset of the first detected subscribers has not answered a request to establish a telephone call.

11. The system of claim 8, wherein the at least one processor is configured to compare the difference between the number of first detected subscribers and the number of second detected subscribers to the threshold by:
   determining a first ratio of first inactive subscribers to first total subscribers detected for the carrier for the first time period;
   determining a second ratio of second inactive subscribers to second total subscribers detected for the carrier for the previous time period; and
   determining that the difference between the first ratio and the second ratio exceeds the threshold.

12. The system of claim 8, wherein the at least one processor is configured to compare the difference between the number of first detected subscribers and the number of second detected subscribers to the threshold by:
   determining an expected number of first detected subscribers for the first time period; and
   determining that the difference between the number of first detected subscribers for the first time period and the expected number of first detected subscribers for the first time period exceeds the threshold.

13. The system of claim 12, wherein the expected number of first detected subscribers for the first time period is determined based on a plurality of numbers of detected subscribers for a plurality of previous time periods.

14. The system of claim 8, wherein the at least one processor is further configured to determine that a second subset of the first detected subscribers comprises recipients of a text message originating at one device.

15. A non-transitory computer-readable medium comprising computer-executable instructions to:
   determine a number of first detected subscribers for a first time period;
   determine a number of second detected subscribers for a previous time period;
   compare a difference between the number of first detected subscribers and the number of second detected subscribers to a threshold;
   determine that a subset of the first detected subscribers is inactive; and
   remove a count of the subset of the first detected subscribers from a count of active subscribers for a carrier.

16. The non-transitory computer-readable medium of claim 15, wherein the instructions to determine that the subset of the first detected subscribers are inactive comprise instructions to determine that each of the subset of the first detected subscribers has had no other interaction with a network.

17. The non-transitory computer-readable medium of claim 15, wherein the instructions to determine that the subset of the first detected subscribers are inactive comprise instructions to determine that each of the subset of the first detected subscribers has not answered a request to establish a telephone call.

18. The non-transitory computer-readable medium of claim 15, wherein the instructions to compare the difference between the number of first detected subscribers and the number of second detected subscribers to the threshold comprise instructions to:
   determine a first ratio of first inactive subscribers to first total subscribers detected for the carrier for the first time period;
   determine a second ratio of second inactive subscribers to second total subscribers detected for the carrier for the previous time period; and
   determine that the difference between the first ratio and the second ratio exceeds the threshold.

19. The non-transitory computer-readable medium of claim 15, wherein the instructions to compare the difference between the number of first detected subscribers and the number of second detected subscribers to the threshold comprise instructions to:
   determine an expected number of first detected subscribers for the first time period; and
   determine that the difference between the number of first detected subscribers for the first time period and the expected number of first detected subscribers for the first time period exceeds the threshold.

20. The non-transitory computer-readable medium of claim 19, wherein the expected number of first detected subscribers for the first time period is determined based on a plurality of numbers of detected subscribers for a plurality of previous time periods.

* * * * *